Figure 1:
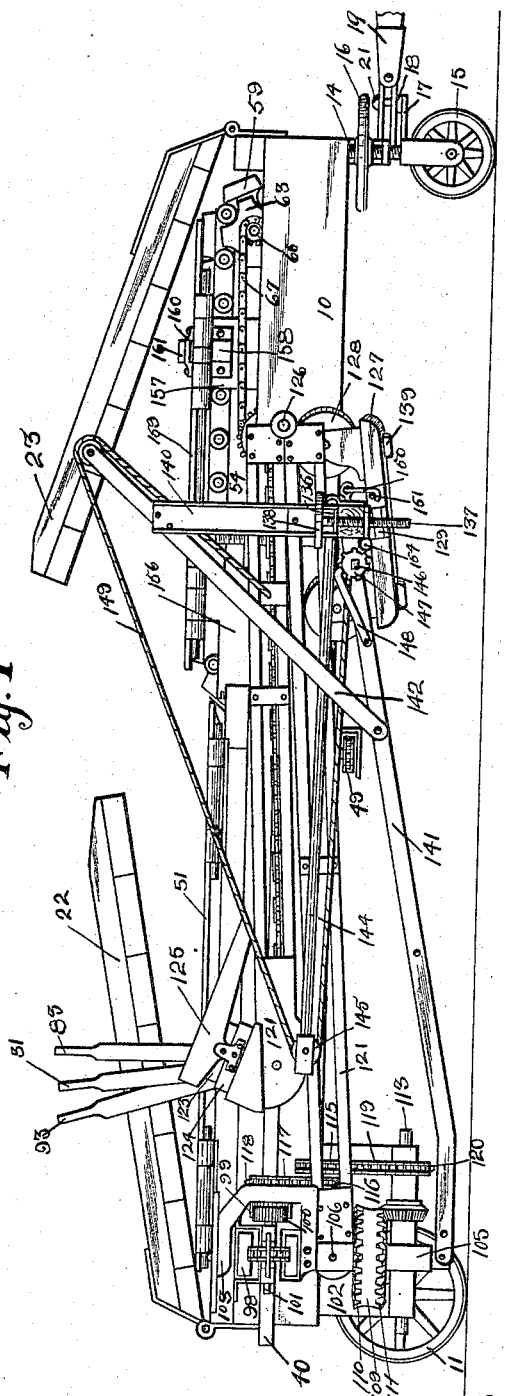

G. B. NELSON.
PORTABLE GRAIN ELEVATOR.
APPLICATION FILED AUG. 31, 1908.

1,168,898.

Patented Jan. 18, 1916.
6 SHEETS—SHEET 1.

Witnesses
F. C. Caswell
A. G. Hague

Inventor
G. B. Nelson,
by Orwig & Lane
Atty's

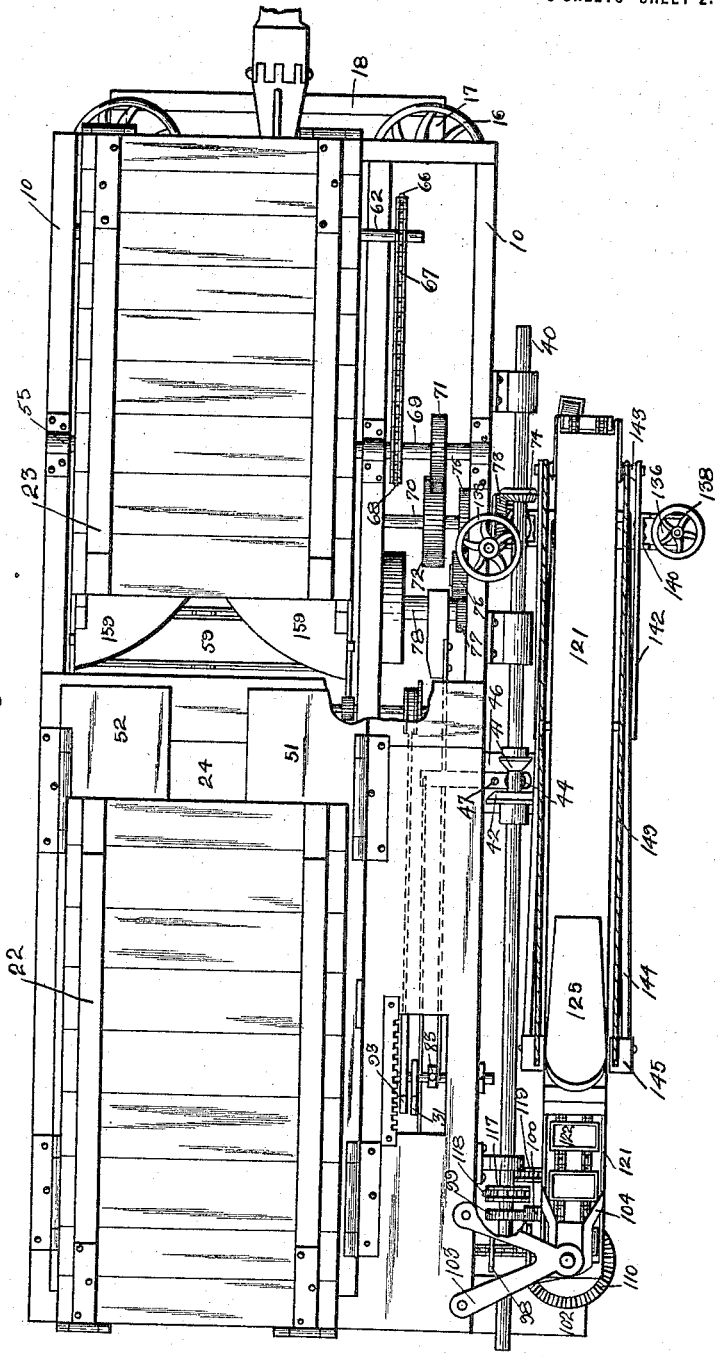

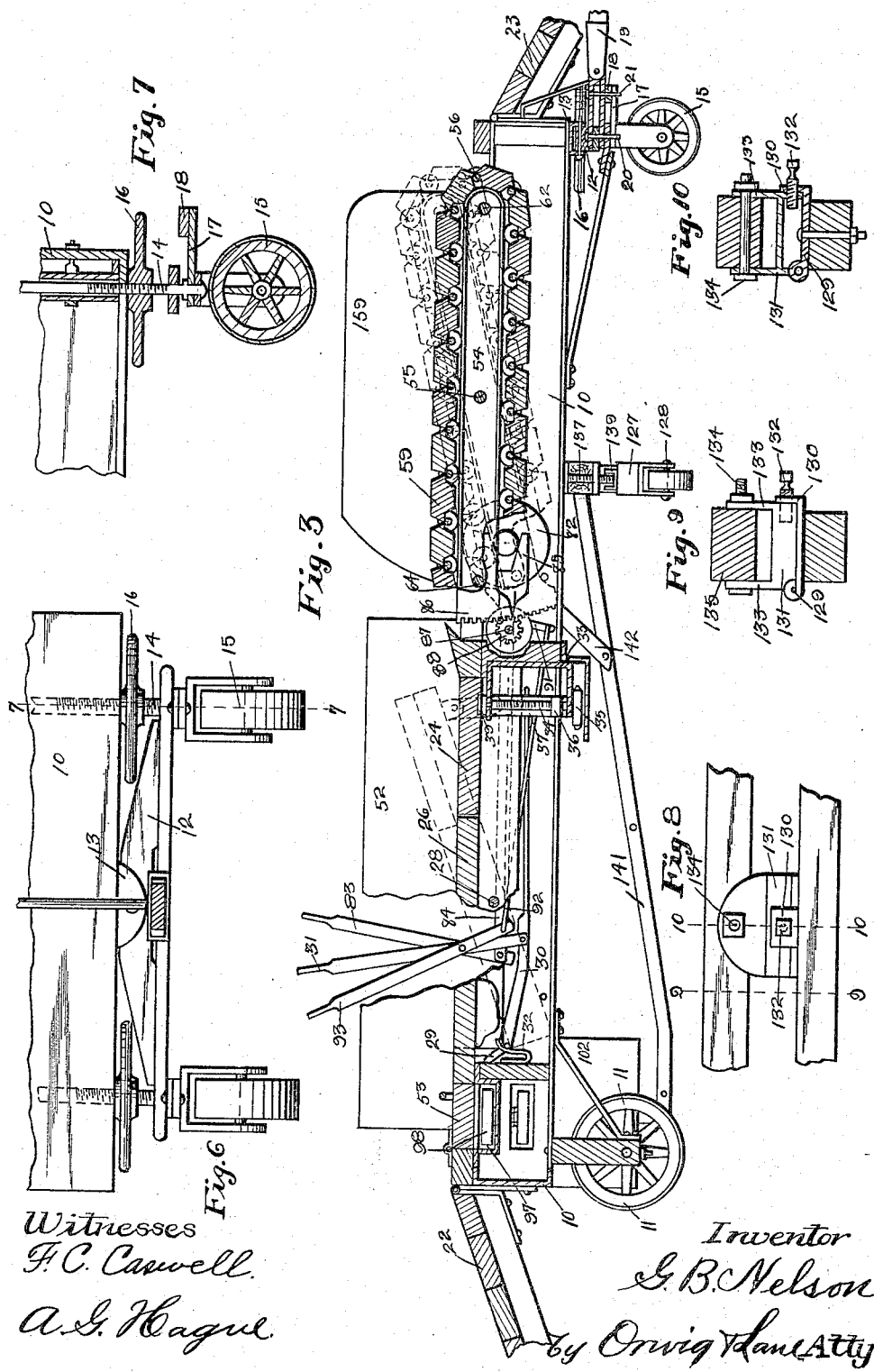

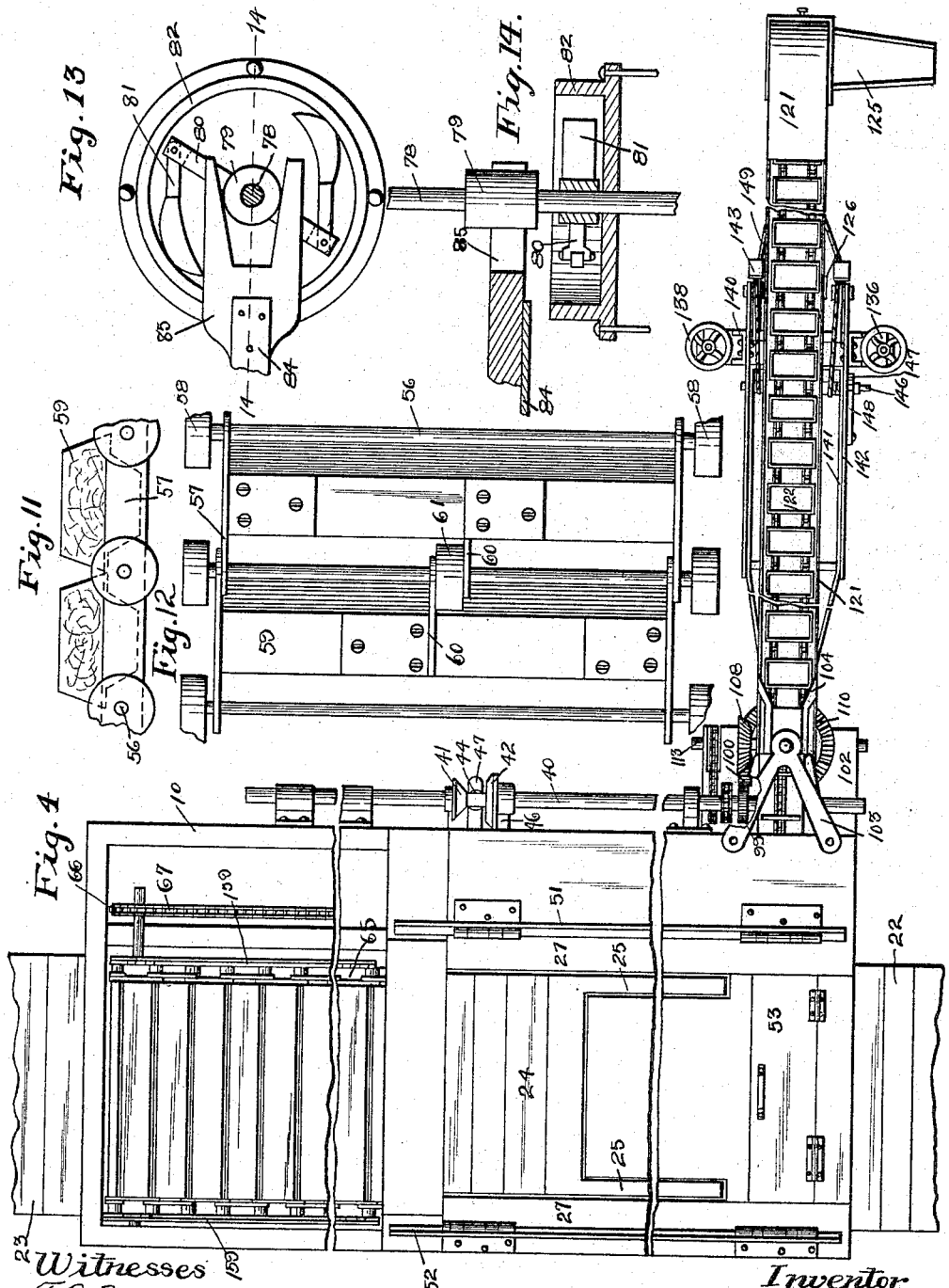

G. B. NELSON.
PORTABLE GRAIN ELEVATOR.
APPLICATION FILED AUG. 31, 1908.
1,168,898.
Patented Jan. 18, 1916.
6 SHEETS—SHEET 5.
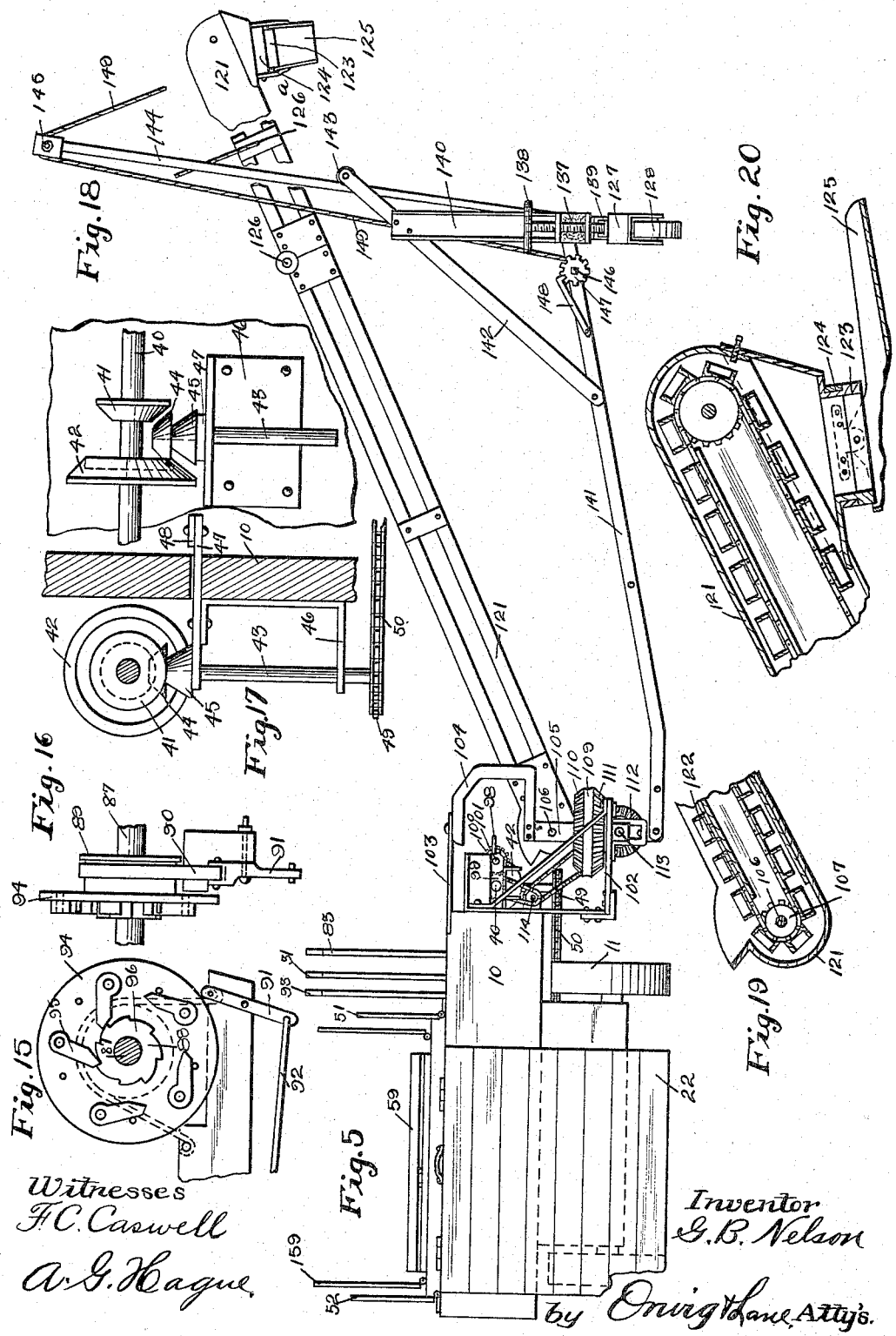

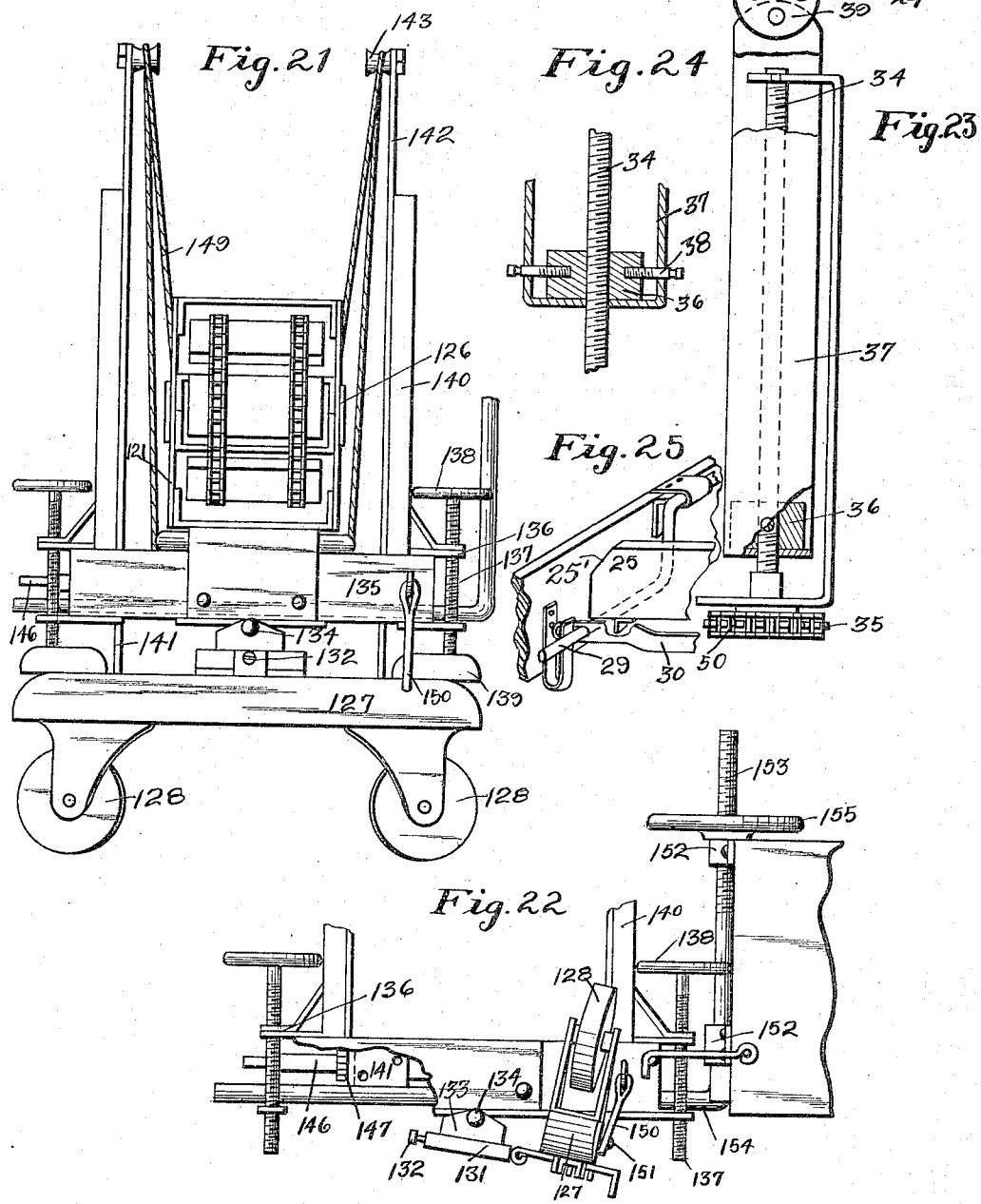

UNITED STATES PATENT OFFICE.

GEORGE B. NELSON, OF REDFIELD, IOWA.

PORTABLE GRAIN-ELEVATOR.

1,168,898.　　　　Specification of Letters Patent.　　Patented Jan. 18, 1916.

Application filed August 31, 1908. Serial No. 451,063.

*To all whom it may concern:*

Be it known that I, GEORGE B. NELSON, a citizen of the United States, residing at Redfield, in the county of Dallas and State of Iowa, have invented a certain new and useful Portable Grain-Elevator, of which the following is a specification.

The object of my invention is to provide a grain elevator of simple, durable and inexpensive construction in which the entire mechanism for unloading a wagon and for discharging the contents thereof into an elevated bin or receptacle is contained wholly upon the supporting trucks and all of the parts are permanently connected together, so that the device may be quickly and easily moved upon its own supporting wheels from place to place and may be quickly adjusted to position for use without detaching or attaching any of the parts thereof.

A further object is to provide a device of this kind which may be successfully and easily operated when resting upon its own supporting wheels on the ground level.

A further object is to provide a portable grain elevator with means whereby the wagon may be moved to tilting position and the grain conveyer operated by power derived from a tread mill which is operated by the draft animals that are attached to the wagon that is being dumped and without the necessity of in any way detaching or unhitching the draft animals from the wagon that is being dumped, thus dispensing with the necessity of providing an auxiliary engine for operating the device and also avoiding the necessity of unhitching the draft animals.

A further object is to provide a device of this kind which may be quickly and easily folded into compact form to rest upon the main supporting frame of the device.

A further object is to provide an improved folding conveyer for a portable grain elevator which folding conveyer is of simple, durable and inexpensive construction, permanently attached to the machine frame, and capable of being quickly and easily adjusted to various angles as required for delivering grain into elevated bins or receptacles, and also so arranged that it may be quickly and easily moved from its extended to its folded position and when in its folded position it will occupy a minimum of space and be supported wholly by the machine frame.

A further object is to provide improved means for manually controlling the tilting movements of the tread power platform and also for tilting the wagon platform to dumping position by power from the tread mill, and further in this connection to provide improved means for automatically returning both the wagon platform and the tread mill platform to horizontal position in alinement with each other after the load has been discharged and for controlling said movements to prevent unnecessary shock and jar to the machine.

Other parts will appear hereinafter in the description.

My invention consists in the construction, arrangement and combination of the various parts of the device whereby the objects contemplated are attained, as hereinafter more fully set forth, pointed out in my claims and illustrated in the accompanying drawings, in which—

Figure 1 shows a side elevation of the complete machine embodying my invention with the parts in their folded positions ready for transportation. Fig. 2 shows a top or plan view of same. Fig. 3 shows a central longitudinal sectional view of the complete machine embodying my invention with the parts in their extended or unfolded position ready for use. The dotted lines in said figure show both the tread power platform and the wagon platform in their tilted positions. Fig. 4 shows a top or plan view of same with the parts in their extended position ready for use. Fig. 5 shows a rear end elevation of the complete device with the various parts extended ready for use. Said view particularly illustrates the position of the elevator chute and connected parts. Fig. 6 shows a detail front elevation of the forward portion of the main frame to illustrate the mechanism for rigidly supporting the main frame when in use as a grain elevator. Fig. 7 shows a vertical central sectional view on the line 7—7 of Fig. 6. Fig. 8 shows an enlarged detail sectional view illustrating the connection between the outer end of the conveyer frame and the beam of the supporting wheels thereof. Fig. 9 shows a sectional view on the line 9—9 of Fig. 8. Fig. 10 shows a sectional view on the line 10—10 of Fig. 8. Fig. 11 shows an enlarged detail side view of a portion of the movable platform of the tread power device. Fig. 12 shows an inverted plan view of same. Fig. 13 shows an enlarged detail view illustrating the friction device for manually stopping the movement of the movable tread platform and also the automatic brake device for stopping the movement of said platform when it is traveling at a high speed. Fig. 14 shows a sectional view on the line 14—14 of Fig. 13. Fig. 15 shows an enlarged detail view illustrating the means for manually holding the tread power platform against tilting movements and also the means for automatically preventing the rear end of the tilting tread power platform from moving downwardly after it has been released to tilt to a horizontal position so that the draft animals may pass off of it and so that when the wagon strikes it it will not tilt. Fig. 16 shows an edge view of same. Fig. 17 shows an enlarged sectional view illustrating the means for controlling the movement of the shaft that raises and lowers the wagon platform. Fig. 18 shows a side view of same. Fig. 19 shows a detail sectional view of the receiving end of the grain delivering conveyer. Fig. 20 shows a longitudinal sectional view of the delivery end of same with the delivery spout in position adjacent thereto. Fig. 21 shows a front elevation of the grain discharging conveyer with the conveyer chute in its folded position. Fig. 22 shows a detail view illustrating the means for supporting the forward end of the grain conveyer on the main frame of the machine for purposes of transportation, said view also illustrating the truck of the grain conveyer frame in its folded position. Fig. 23 shows an enlarged detail view partly in section illustrating the means for elevating the wagon platform. Fig. 24 shows a sectional view on the line 24—24 of Fig. 23, and Fig. 25 shows an enlarged detail view illustrating the means for securing the wagon platform in its horizontal position.

Referring to the accompanying drawings, I have used the reference numeral 10 to indicate the main frame of the device. This frame is supported at its rear end upon the wheels 11 and at its front end is a truck comprising a bolster 12 pivotally connected by means of the bracket 13 with the frame 10 so that the ends of the bolster may tilt up and down relative to the main frame. Extended through each end of the bolster is a screw threaded upright 14 having a wheel 15 mounted in its lower end and also having mounted on it between the main frame and the bolster a screw threaded hand wheel 16. Connected with the lower portion of each of the uprights 14 is a forwardly projecting arm 17 and said arms are connected by means of a link 18. The tongue 19 is connected by a pin 20 with the bolster 12 and also by a pin 21 with the link 18. By this arrangement and assuming that the hand wheels 16 are at their lower limit of movement, then the device may be advanced in the ordinary way by draft animals and it will be steered by the tongue connected with the link 18. The bolster will be permitted to tilt laterally to accommodate inequalities of the road surface; however, when the machine is in position for use, the operator pulls both of the hand wheels 16 until they engage the frame and by this means he can level up the frame and firmly hold it against tilting movements.

Pivotally connected to the rear end of the frame is an approach platform 22 capable in one position of inclining downwardly and rearwardly from the machine to permit a wagon to be driven up over it onto the machine and in another position of being folded over the top of the machine. At the forward end of the machine frame is a second platform 23 of the same kind to permit the wagon to be driven from the machine.

At the rear portion of the top of the machine is a tilting platform 24 having two rearwardly extending portions 25. The part 24 is designed to receive the forward wheels of a wagon and the extensions 25 are designed to receive the rear wheels thereof. The space between the extensions 25 is filled by means of a fixed or stationary platform 26 and the top of the machine outside of the tilting platform is also covered by stationary side pieces 27. The tilting platform 24 is mounted upon the shaft 28 and the arrangement of the tilting platform relative to the stationary portions is such that when a wagon is driven on top of the machine the rear wheels will rest on the rear extensions 25. Then when the platform 24 is tilted the stationary parts 26 and 27 surrounding the rear wheels will prevent the wagon from moving laterally or rearwardly, so that it is not necessary to provide other means for holding the wagon to the tilting platform and the rear axle of the wagon will rest upon the stationary parts 26 and 27 when the platform is in a tilted position and which obviously provides a stop to limit the tilted position of the platform. I have provided means for locking the tilting platform 24 in its horizontal position as follows:

Mounted on the stationary part of the frame is a crank shaft 29 having a crank arm normally extended downwardly and capable of projecting forwardly under the rear end of the tilting platform to thereby hold the tilting platform against downward movement. In order to release the tilting platform from said crank arm, I have provided a bar 30 having a limited sliding connection with the crank arm and also connected to the lever 31. When said lever is moved forwardly the crank arm will be moved rearwardly and withdrawn from beneath the tilting platform, thus permitting the rear end of the tilting platform to move downwardly. I preferably provide a spring 32 to normally engage said crank arm and yieldingly hold it in position under the tilting platform.

A considerable amount of power is required for raising the tilting platform with a loaded wagon on it and it is desirable that this platform be raised slowly. It is also desirable that when the tilting platform is lowered it may be moved quickly. I have, therefore provided the following described mechanism for raising and lowering the platform: Referring to Figs. 3, 23 and 24, I have used the reference numeral 33 to indicate a stationary bracket having a vertical shaft 34 rotatably mounted in it. This shaft is screw threaded and on its lower end is a sprocket wheel 35. Mounted upon the shaft 34 is a screw threaded block 36. This block is mounted within an upright frame 37 and is fixed to said frame by means of the screws 38. The upper end of the frame 37 is pivoted to a bracket 39 attached to the end surface of the forward end of the tilting platform. By this arrangement it is obvious that when the screw shaft 34 is rotated in one direction the block 36 will be elevated and the forward end of the platform will be raised. A reverse movement of the shaft 34 will result in lowering the forward end of the tilting platform. Arranged along the right side of the machine frame is a shaft 40. Fixed to the shaft 40 are two cones, a small one 41 and a large one 42. Mounted adjacent to the cones 41 and 42 is an upright shaft 43 having two small cones thereon 44 and 45, the former being designed for engagement with the small cone 41 and the latter with the large cone 42. Said shaft is mounted in a bracket 46 fixed to the side of the machine frame and is so arranged that it has a limited lateral movement therein. A lever 47 is fulcrumed to the top of the bracket 46 and is connected to the shaft 43. The inner end of said lever is pivotally connected to a rod 48, which rod is connected to the bar 30. On the lower end of the shaft 43 is a sprocket wheel 49 connected by the sprocket chain 50 with the sprocket wheel 35. By this arrangement of parts it is obvious that when the lever 31 is moved forwardly to the position where it must stand in order to release the rear end of the tilting platform, and the small cone 41 being in engagement with the cone 44, the shaft 40 is at the same time rotated by means hereinafter described, whereby the shaft 43 will be rotated at comparatively slow speed and this will cause the screw 34 to be turned and the forward end of the tilting platform to be elevated. Then when the lever 31 is moved rearwardly, the cone 42 will be in engagement with the cone 45 and the shaft 43 will be rotated rapidly and in the direction required for returning the tilting platform to horizontal position, and after the tilting platform is thus returned it will be held in its horizontal position by the crank shaft 29 as before described.

As the lever 31 is moved rearwardly for returning the tilting platform to horizontal position the arm of the crank shaft 29 is engaged by the beveled edge 25′, on the extensions 25 (shown in Fig. 25), as a result of which said extensions move upwardly past said crank shaft, while the connecting bar 30 is allowed to move rearwardly because of the slot connection with said crank shaft, (shown in Fig. 25). From this it will be seen that while the bar 30 is moved rearwardly sufficiently to throw the elevating mechanism into operation, the crank shaft 29 is held against returning to its normal position because of the bevel edge 25′ on the extensions 25 until after said extensions have passed the crank shaft in their upward movement, when said crank shaft is by means of the spring 32 forced outwardly and supports said extension from the underside.

This tilting platform is also firmly and immovably held in any position of its adjustment by the screw 34 and hence it cannot tilt in any direction until the said screw is rotated. The crank shaft 29 is simply for the purpose of relieving the screw of all strains when a wagon is moving to position on the platform or moving off of it. Arranged at opposite sides of the platform 24 are two hinged side-boards 51 and 52 capable of folding to position over the tilting platform when not in use and of standing in upright positions when in use to form a guide-way for the draft animals and the wagon.

In the rear of the tilting platform is a small hinged door 53 so arranged that when open it will stand in an upwardly and rearwardly inclined position and permit the contents of the wagon on the tilting platform to be dumped into the opening which said door covers to enter the conveyer located beneath the door 53 as hereinafter described.

In front of the wagon platform is a second tilting platform 54 mounted upon the shaft 55. Said tilting platform 54 is provided with an endless rolling platform of the kind generally employed in a tread power. This rolling platform is illustrated in Figs. 3, 11 and 12 and comprises a series of transverse shafts 56 connected by links 57 and having rollers 58 on their ends. Between each pair of the shafts 56 is a platform cross piece 59 fixed to the links 57 at their ends and to the shafts 56 at their central portions by means of the brackets 60. Said shafts are also provided with rollers 61 at their central portions. These rollers are all arranged to travel upon suitable tracks. Mounted on the platform 54 at the forward end thereof is a shaft 62 having sprocket wheels 63 at its ends, said sprocket wheels being designed to receive the rollers 58 to thereby drive the shaft 62 when the rolling platform is moved. At the rear of the platform 54 is a shaft 64 having sprocket wheels 65 on its ends similar to the spocket wheels 63. The sprocket wheels 65 on the shaft 64 are simply idlers. On one end of the shaft 62 is a sprocket wheel 66 connected by a sprocket chain 67 with the sprocket wheel 68, the latter being fixed to the shaft 69 rotatably mounted in the machine frame as shown in Fig. 2. By this arrangement it is obvious that when the rolling platform is advanced the shaft 69 will be rotated. Adjacent to the shaft 69 is a short shaft 70 connected to the shaft 69 by the gear wheels 71 and 72 in mesh with each other. The shaft 70 is connected with the shaft 40 by means of two beveled pinions 73 and 74. Mounted upon the shaft 70 is a large pinion 75 in mesh with a smaller idler pinion 76, the latter being in mesh with a still smaller pinion 77 fixed to the shaft 78. This shaft 78 has a hub 79 fixed thereon and having radial arms 80 fixed thereto. On the radial arms 80 are the brake levers 81. These brake levers are arranged within a stationary rim 82 fixed to the machine frame, said parts being so arranged that when the shaft 78 is rotated at high speed, the brake levers 81 will move outwardly by centrifugal force and will engage the stationary rim 82 with sufficient force to stop or at least greatly retard the movement of the shaft 78. By this arrangement the rolling platform is automatically prevented from moving at a speed higher than the safety of the draft animals on it would warrant. I have also provided means for manually locking the shaft 78 against rotation to thereby hold the rolling platform against movement as follows: The reference numeral 83 indicates a lever fulcrumed to the machine frame and having a bar 84 pivoted to it. On the other end of the bar 84 is a brake shoe 85 having a tapered opening therein designed to receive the hub 79, hence by moving the upper end of the lever 83 rearwardly, the brake shoe 85 is moved forwardly and the hub 79 is wedged therein and prevented from turning.

In order to successfully operate a tread power of this kind, it is necessary that it be arranged at an angle relative to a horizontal line and in order that the draft animals and the wagons may easily pass over it, it must be so arranged that it can be placed in a horizontal position and there held. To provide, therefore, for tilting the platform 54 and for holding it in different positions of its adjustment, I have fixed to the rear end of the platform 54 a segmental rack 86 and at the rear of said rack is a shaft 87 having a pinion 88 fixed thereon in mesh with said rack. Rotatably mounted on the shaft 87 is a band wheel 89 and passed around this band wheel is a band brake 90 having one end fixed to the stationary support and the other end fixed to the lever 91. This lever 91 is connected by means of a rod 92 with a lever 93, hence, when said lever is pulled forwardly at its upper end the lever 91 is moved to position for tightening the band brake upon the band wheel and thus holding the shaft 87 against rotary movement, however, when said band brake is released the platform is free to tilt in either direction. Fixed to the band wheel 89 is a disk 94 having a series of gravity pawls 95 thereon designed to engage a ratchet wheel 96 which is fixed to the shaft 87.

In use with this portion of the device and assuming that the band brake 90 is firmly held in engagement with the band wheel 89, then obviously, the shaft 87 cannot rotate in a direction for tilting the platform because the pawls 95 are in engagement with the ratchet wheel 96 which is fixed to the shaft 87. Then when the draft animals are on the platform the band brake 90 is released, thus permitting the band wheel 89 and the disk 94 to rotate with the ratchet wheel 96 in the direction required for permitting the rear end of the tilting platform to move downwardly. Then when it is desired to drive the draft animals and wagon from the machine, the movement of the rolling platform is stopped and the draft animals are driven to the forward end of the tread power platform and their weight causes the tread power platform to tilt to a horizontal position. Immediately after this, the front wheels of the wagon will strike upon the rear end of the tilting platform and unless some means were provided for automatically securing the tilting platform in its horizontal position it would again tilt. However, by providing the ratchet wheel 96 to the shaft 87 and the combined band wheel and disk 94 with the pawls 95, the shaft 87 is thereby held against such movement as would permit the rear end of the platform to move downwardly, therefore, when the band brake 90 is loose the tread power platform is free to tilt rearwardly below horizontal position but limited in its forward movement to horizontal position, the driving shaft 62 projecting beyond the main frame and thereby acting as a stop to prevent movement of the platform forwardly below horizontal position. When the band brake is tight, the forward end of the tread power platform may move downwardly to horizontal position, but the rear end is automatically locked against downward movement.

The means for handling the grain that is discharged from the rear end of the wagon through the opening covered by the hinged door 53, comprises the following mechanism: Below the hinged door 53 is a compartment 97 having therein a conveyer 98 which conveyer is driven by means of a pinion 99 on the shaft 40 in mesh with a pinion 100 on the shaft 101 of the conveyer 98. By this means the material discharged from the wagon is delivered laterally to the side of the machine. Fixed to the side of the machine frame below the discharge end of the conveyer 98 is a bracket 102 and above the discharge end of the conveyer is a second bracket 103. Pivoted to the bracket 103 is a hanger 104 and attached to this hanger is a frame 105 rotatably supported upon the bracket 102.

Arranged in the frame 105 is a shaft 106 having a sprocket wheel 107 thereon. On the end of the shaft 106 is a beveled pinion 108 which pinion is driven as follows: Rotatably mounted upon the frame 105 is a rim 109 having beveled gear teeth 110 at its top in mesh with the beveled pinion 108 and also having beveled teeth 111 at its bottom. The latter gear teeth are arranged in mesh with a pinion 112 which pinion is fixed to a shaft 113 mounted in bearings on the bottom of the bracket 102 and said shaft is driven by power from the shaft 40 as follows:

Fixed to the side of the main frame below the shaft 40 is a counter shaft 114 having two sprocket wheels 115 and 116 fixed thereon. The latter is connected by a sprocket chain 117 with a sprocket wheel 118 on the shaft 40 and the former is connected by means of a sprocket chain 119 with a sprocket wheel 120 on the shaft 113. By this arrangement it is obvious that the shaft 106 will be rotated whenever the shaft 40 is rotated regardless of the position of the frame 105, that is to say, said frame 105 may freely swing in a horizontal plane without in any way affecting the gearing device that connects the shaft 106 with the shaft 40.

Pivoted to the frame 105 is the conveyer chute 121 and in this conveyer chute 121 is a bucket conveyer 122 driven by the sprocket wheel 107. At the outer end of the conveyer chute is a spout 123 designed to receive the discharge from the buckets, and connected with this spout is a rotatable collar 124 which collar has pivotally attached to it a discharge spout 125. Midway between the ends of the conveyer chute is a hinge joint 126 so arranged as to permit the outer end to fold upwardly over the inner end.

I have provided for adjusting the conveyer chute to any desired position of adjustment and also for folding it to position for transportation as follows: Referring to Fig. 21 of the drawings, I have used the reference numeral 127 to indicate a beam having two supporting wheels 128 mounted thereon in line with the beam to which they are attached. Pivoted on top of the beam 127 is a hinge member 129 clearly shown in Figs. 8, 9, and 10, and having an upwardly extending lug 130 at its forward end. The other hinge member 131 normally rests on top of the hinge member 129 and may be securely clamped thereto by means of the set-screw 132 passed through the lug 130 and into the hinge member 131. On top of the hinge member 131 are two lugs 133 pivotally connected by means of the bolt 134 with a second beam 135, said second beam being free to tilt on the bolt 134. In order to adjust the beam 135 to a horizontal position independent of the position of the lower beam, I have provided on each end of the upper beam two brackets 136 with a screw 137 mounted therein and provided with a hand wheel 138 at its top. The lower end of each screw is designed to enter between the up-turned edges of a plate 139 on the lower beam. Mounted on top of the beam 135 is a stationary frame 140 and connected to the beam 135 is an arm 141, pivotally mounted to the lower end of the bracket 102. A brace 142 is connected to the arm 141 and to the upright frame 140. These braces 142 extend forwardly beyond the frame 140 and each is provided with an inwardly projecting grooved roller 143. Pivotally mounted on top of the beam 135 are two uprights 144 having their upper ends connected and provided with pulleys 145. Mounted upon the arm 141 is a shaft 146 having a notched wheel 147 thereon, designed to be engaged by a pawl 148 to hold said wheel against rotation. Fixed to and wound upon the shaft 146 are the ends of a rope or cable 149. This rope or cable extends upwardly over the pulleys 145 and then through an opening formed in the conveyer chute at a point spaced apart from the hinge joint 126 in a direction toward the delivery end of the chute. The arrangement of the parts just described is such that when the inner section of the conveyer chute is elevated above the upper beam, the uprights 144 will rest against the rollers 143 as shown in Fig. 5, and the rope or cable 149 will support the inner end of the outer section in an elevated position because the greatest weight of the outer section is beyond the point where the rope or cable is attached to it, so that the two sections will thus be held in line and they may be jointly elevated or lowered as desired by manipulating the shaft 146. Assuming that the conveyer is in its folded up position as shown in Fig. 1, and assuming that it is desired to move it to its extended position, then the operator manipulates the shaft 146 and the rope or cable jointly elevates the uprights 144 and the outer end of the outer section until the uprights 144 strike upon the rollers 143. He then permits the shaft 146 to unwind and thus gradually lowers the outer section until the outer section passes a vertical line, whereupon the weight of its outer end will cause the outer end of the inner section to be elevated to position in line with the outer section and then both sections may be jointly raised or lowered to the desired position. By means of the pawl 148, the conveyer chute may be held in any position of its adjustment.

I have provided means for supporting the entire conveyer frame on the side of the machine frame for transportation as follows: I first remove the set-screw 132 and then swing the lower beam 127 to an inverted position with the wheels 128 extended upwardly. I then swing the lower beam to position at right-angles to the upper beam and support it in this position by means of a hook 150 arranged to engage a pin 151 on the lower beam as shown in Fig. 22. Mounted on the side of the main frame in suitable brackets 152 is an upright shaft 153, screw threaded at its upper end, and having its lower end extended horizontally to form a support 154. Mounted above the upper bracket 152 is a screw threaded hand wheel 155. The support 154 may be swung along side of the main frame, or project out from the main frame. When this support is swung out, the conveyer frame is moved to position above it. Then the operator manipulates the hand wheel 155 so that the extension 154 will engage the bottom of the conveyer frame as the shaft 153 moves upwardly and thus the entire conveyer frame will be elevated and supported. The said arm 153 is prevented from swinging laterally when in an elevated position by means of a slot formed in the lower end of the bracket 152 and designed to receive the extension 154 as clearly shown in Fig. 22.

At each side of the platform 54 are two hinge members 156 and 157. The hinge member 157 is provided with a slide-bolt keeper 158. Connected to the hinges 156 and 157 is a side-board 159 and mounted upon this side-board is a slide-bolt loop 160 having a slide-bolt 161 mounted therein and capable of entering the keeper 158 when the side-board is in a vertical position. When the slide-bolt is withdrawn from the keeper 158, the side-board may be folded down over the top of the roller platform.

Having thus described all of the various features of the invention in turn, both structurally and functionally, it is believed that the operation of the entire machine as a whole will be readily understood.

I claim as my invention—

1. In a machine of the class described, the combination of a frame, a tilting wagon platform pivotally mounted on said frame, a rock shaft mounted in said frame and having a depending crank section capable of moving under the rear of the tilting platform, an upright member pivoted to the front end of said platform, a block connected to said upright member and having a screw-threaded opening therein, a screw shaft passing through said block, an upright shaft, means for gearing said upright shaft to said screw shaft, power mechanism for rotating said upright shaft in either direction, a lever, and means connected with said lever for controlling the movement of said power mechanism, said controlling means being arranged to withdraw said crank section from beneath the rear end of the tilting platform when the screw shaft is moved in a direction to lift the front end of said platform.

2. In a machine of the class described, the combination of a frame, a tilting wagon platform pivotally mounted thereon, means for operating said platform about its point of pivot, mechanism for locking said platform in horizontal position consisting of a rock shaft journaled in said frame and provided with a depending crank section capable of movement under the rear end of said platform to prevent the same from tilting downwardly, a spring for normally holding said crank section in position under said platform, and means for simultaneously controlling said platform operating means and said locking mechanism.

3. In a device of the class described, the combination of a frame, a tilting wagon platform pivotally mounted within said frame, a screw threaded shaft journaled upon said frame and operatively connected to said platform near one end on the underside thereof, power mechanism operatively connected to said shaft below said platform for operating said shaft, and a reversing mechanism below said platform for controlling the upward and downward movement of said shaft, and a retaining means at the opposite end of said platform for holding said platform in its normal position and a lever extending above said platform and operatively connected below said platform to said retaining means and said reversing mechanism, whereby said retaining means and said reversing mechanism may be simultaneously operated at the initial movement of either the raising or lowering operation of the platform.

4. In a device of the class described the combination of a frame, a tilting wagon platform pivotally mounted thereon, means positioned below one end of said platform and connected with the underside thereof for raising and lowering said platform, a reversing mechanism positioned below said platform for controlling said raising and lowering mechanism, a retaining member at the opposite end of said platform for holding said platform in its normal position and a lever operatively connected with said reversing mechanism and said retaining means whereby said reversing mechanism and said retaining means are simultaneously operated at the initial movement of either the raising or lowering operation.

5. In a machine of the class described, the combination of a frame, of a tilting platform pivotally mounted on said frame, a depending bracket carried by one end of said platform on the under side thereof, a block pivotally mounted within said bracket, a stationary bracket carried by the frame and having a screw threaded shaft journaled therein, said block operating upon said screw threaded shaft, and means below said platform for rotating the said shaft whereby the platform may be tilted.

6. In a machine of the class described, the combination with the frame, a tilting wagon platform pivotally mounted on said frame, a depending U-shaped bracket pivotally mounted upon one end of said platform, a stationary U-shaped bracket carried by the frame, a screw threaded shaft journaled within the extremities of the stationary U-shaped bracket, a block adapted to travel upon said shaft, means for pivotally mounting said block within the lower end of the depending U-shaped bracket, and means for rotating said screw-threaded shaft whereby the platform may be tilted in either direction.

Des Moines, Iowa, July 11, 1908.

GEORGE B. NELSON.

Witnesses:
RALPH ORWIG,
NELLIE M. TAYLOR.

Copies of this patent may be obtained for five cents each, by addressing the "Commissioner of Patents, Washington, D. C."